Feb. 17, 1970  YI-CHUNG CHANG  3,495,741
APPARATUS FOR CONTROLLING THE FLOW OF A FLUID MATERIAL
Filed June 6, 1968  4 Sheets-Sheet 2

INVENTOR.
YI-CHUNG CHANG
By R.J. Leek Jr.
Attorney

INVENTOR.
YI-CHUNG CHANG

United States Patent Office
3,495,741
Patented Feb. 17, 1970

3,495,741
APPARATUS FOR CONTROLLING THE FLOW OF A FLUID MATERIAL
Yi-Chung Chang, Franklin Township, Westmoreland County, Pa., assignor to United States Steel Corporation, a corporation of Delaware
Filed June 6, 1968, Ser. No. 735,099
Int. Cl. B67d 5/54
U.S. Cl. 222—193       28 Claims

ABSTRACT OF THE DISCLOSURE

This invention relates to apparatus for controlling the flow of fluid material. This apparatus for controlling the flow of a fluid material has a fluid material container disposed at a first level for containing the fluid material and has a first fluid material outlet. A separation chamber is provided for receiving the fluid material and a carrier fluid having a density less than the fluid material. A mixing chamber having one end spaced from the first level is connected to the fluid material container and the separation chamber for mixing the fluid material and the carrier fluid. Carrier fluid supply means are connected to the mixing chamber adjacent the fluid material container for introducing the carrier fluid into the mixing chamber to mix the fluid material and the carrier fluid into a mixture having a density less than the fluid material and to cause an unbalance between the forces on the fluid material in the fluid material container and the forces on the mixture in the mixing chamber to transfer the fluid material and the carrier fluid to the separation chamber. The carrier fluid supply means has make-up carrier fluid inlet means. Control means are provided, such as a level control means, in the fluid material container which are connected to one of the carrier fluid supply means and the make-up carrier fluid inlet means for controlling the flow of the carrier fluid into the mixing chamber and thereby maintaining a substantially constant level of fluid material in the fluid material container.

BACKGROUND OF THE INVENTION

Heretofore, the transfer of fluid materials, such as molten metals, corrosive liquids (i.e., caustic and highly-acid materials) and slurries of ore, coal and the like have been accomplished by conventional hydraulic systems or the gas lift type of pump.

Apparatus of this type is disclosed in the following U.S. Patent No. 2,399,634, Holland et al., issued May 7, 1946; 2,819,059, Breymeier, Jan. 7, 1958; 2,937,789, Rama, May 24, 1960; 3,123,015, Linklater Mar. 3, 1964.

None of these conventional devices provides control means for controlling the flow rate of the fluid material; provides means for discharging the fluid material at a pressure either higher or lower than atmospheric; or maintains substantially constant the level of fluid material in the fluid material container, the pressure in the fluid material container, the temperature of the mixture in the mixing chamber, the pressure in the separation chamber, or the level of fluid material in the separation chamber.

OBJECTS OF THE INVENTION

It is the general object of this invention to avoid and overcome the foregoing and other difficulties of and objections to prior art practices by the provision of apparatus for controlling the flow of a fluid material and a carrier fluid having a density less than the fluid material, which apparatus:

(1) Has a simple rugged structure;
(2) Employs no moving parts in contact with the fluid material;
(3) Requires a minimum of maintenance;
(4) Controls the flow rate of the fluid material from the fluid material container to maintain a constant level in such container;
(5) Discharges the fluid material to a pressure either higher or lower than atmospheric pressure;
(6) Maintains substantially constant the level of fluid material in the fluid material container;
(7) Maintains substantially constant the predetermined pressure in the fluid material container;
(8) Maintains substantially constant the temperature of the mixture in the mixing chamber;
(9) Maintains substantially constant the pressure in the separation chamber; and
(10) Maintains substantially constant the level of the fluid material in the separation chamber.

BRIEF SUMMARY OF THE INVENTION

The aforesaid objects of this invention, and other objects which will become apparent as the description proceeds, are achieved by providing apparatus for controlling the flow of a fluid material and having a fluid material container disposed at a first level for containing the fluid material and having a first fluid material outlet; a separation chamber for receiving the fluid material and a carrier fluid having a density less than the fluid material; a mixing chamber having one end spaced from the first level and connected to the fluid material container and the separation chamber for mixing the fluid material and the carrier fluid; and carrier fluid supply means connected to the mixing chamber adjacent the fluid material container for introducing the carrier fluid into the mixing chamber to mix the fluid material and the carrier fluid into a mixture having a density less than the fluid material and to cause an unbalance between the forces on the fluid material in the fluid material container and the forces on the mixture in the mixing chamber to transfer the fluid material and the carrier fluid to the separation chamber. The carrier fluid supply means has make-up carrier fluid inlet means. Control means are provided, for example level control means in the fluid material container, which are connected to one of the carrier fluid supply means and the make-up carrier fluid inlet means for controlling the flow of the carrier fluid into the mixing chamber and thereby maintaining a substantially constant level of fluid material in the fluid material container.

BRIEF DESCRIPTION OF THE SEVERAL VIEWS OF THE DRAWINGS

For a better understanding of this invention reference should be had to the accompanying drawings, wherein like numerals of reference indicate similar parts throughout the several views and wherein.

Although the principles of this invention are broadly applicable to controlling the flow of fluid material, this invention is particularly adapted for use in conjunction with the flow of molten iron from a blast furnace and hence it has been so illustrated and will be so described.

DETAILED DESCRIPTION

Figure 1:
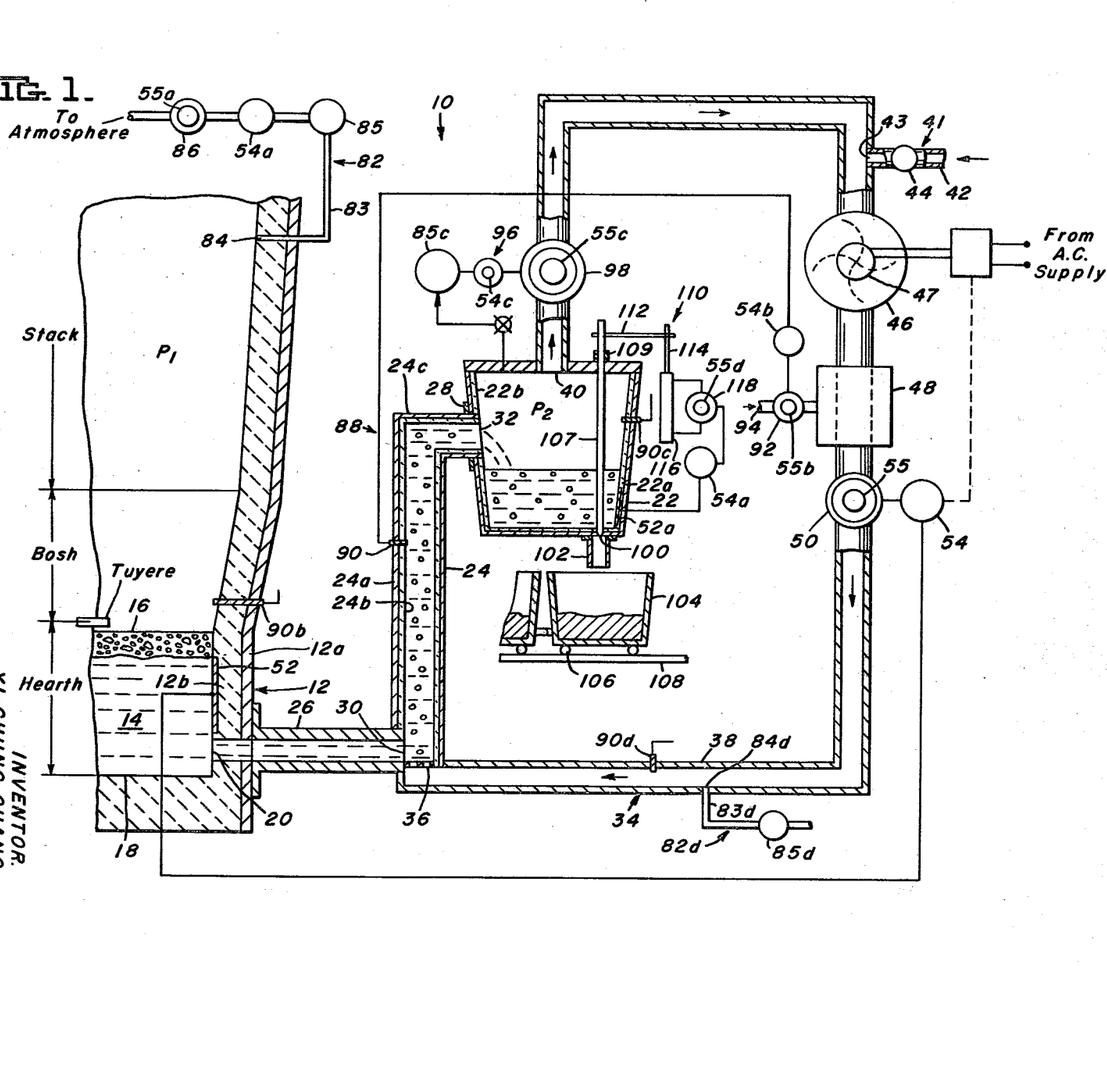
FIGURE 1 is a fragmentary schematic view partially in section of the apparatus for controlling the flow of a fluid material, such as molten iron from a blast furnace.

With specific reference to the form of this invention illustrated in the drawings, and referring particularly to FIGURE 1, an apparatus for controlling the flow of a fluid material, such as molten iron and the like, is indicated generally by the reference numeral 10.

This apparatus 10 has a fluid material container, such as a hearth 12 of a blast furnace, shown fragmentarily in the lower left-hand portion of FIGURE 1. This hearth contains a fluid material, such as molten iron 14, covered by a layer of slag 16 and is disposed at a first level indicated by the bottom 18 of the hearth 12. For the purpose of exiting the molten metal 14, the hearth 12 has a first fluid material outlet, such as the molten iron outlet 20. In the conventional manner the hearth 12 has a steel shell 12a lined with a refractory heat and corrosion resistant material 12b, such as high-density carbon brick, fire-clay brick, tar-bonded magnesite brick or the like manufactured by Harbison-Walker Refractories Company, Pittsburgh, Pa., under the trade names Oxiline H or Oxiline CL. Disposed above and to one side of the hearth 12 is a separator chamber 22 for receiving the molten iron 14 and a carrier fluid having a density less than the molten iron 14.

Suitable carrier fluids are molten glassy materials such as glass, slag and glazes or the like having a composition, for example, of about 50% $CaF_2$, 25% $CaO$, 25% $SiO_2$ and a melting point of about 1130° C.; molten metals, such as Wood's metal, lead or the like; molten salts, such as fluospar ($CaF_2$) or the like; and preferably inert gases, such as argon, nitrogen, helium, steam, carbon oxides (Ca and $CO_2$) and a hydrocarbon gas, such as methane.

The separation chamber 22 is provided with a steel shell 22a and is lined with a refractory material 22b, such as the above-mentioned brick, in the conventional manner. For the purpose of connecting the hearth 12 and the separation chamber 22 and thereby mixing the molten iron 14 with the inert carrier gas, a mixing chamber 24 is provided having one end in this case the upper end 24c spaced from the first level (i.e., the bottom 18 of the hearth 12) and is connected to the outlet 20 of the hearth 12 by a coupling 26 and to the separation chamber 22 by a flange 28 on the separation chamber 22 respectively. The coupling 26 is connected to the mixing chamber 24 (adjacent the bottom of the mixing chamber 24 by means of an inlet 30 to such chamber 24), and in turn the upper portion 24c of the mixing chamber 24 is provided with an inlet 32 to the separation chamber 22.

In like manner the mixing chamber 24 comprises essentially a steel shell 24a lined with the above-described refractory material 24b. In order to mix the inert carrier gas with the molten iron 14 into a mixture having a density less than the molten iron 14, carrier fluid supply means 34 is connected to the mixing chamber 24 through a perforated inlet 36 adjacent the inlet 30 from the coupling 26.

The resultant mixture of the inert carrier gas and the molten iron 14 causes an unbalance between the forces in the hearth 12 (i.e., the pressure $P_1$, the slag 16 and the molten iron 14) and the forces on the mixture of inert carrier gas and molten iron 14 in the mixing chamber 24 (i.e., the pressure $P_2$ and the mixture of molten iron 14 and inert carrier gas), thereby causing the transfer of the molten iron 14 and the carrier inert gas to the separation chamber 22.

As shown in FIGURE 1 the carrier fluid supply means 34 has a conduit 38 which extends from the perforated inlet 36 to the gas outlet 40 provided in the upper portions of the separation chamber 22. Carrier make-up gas is introduced into the conduit 38 through a make-up carrier fluid inlet means 41, such as a make-up line 42, having a valve 44. Such gas is driven in the direction of the arrows from an inlet 43 in conduit 38 from line 42 by drive means, such as a blower 46 (driven by a motor 47), through a heating means, such as a furnace 48, and a flow control valve 50, to the perforated inlet 36 adjacent the bottom of the mixing chamber 24.

FIRST LEVEL CONTROL MEANS 51

In order to control the flow of the molten metal 14, control means, such as a level control means 51 (FIGURE 2) in the form of a level indicator 52 (FIGURES 1, 2), (of the type disclosed in U.S. Patent No. 3,370,466, issued Feb. 27, 1968, by the inventor of the subject invention and assigned to the same assignee as the present invention or of the type shown in U.S. Patent No. 3,204,-460, issued Sept. 7, 1965, to Milnes and assigned to the same assignee as the present invention) is provided in the side wall of the hearth 12 and is connected to one of the carrier fluid supply means 34 and the make-up carrier fluid inlet means 41 (in this case the carrier fluid supply means 34) for controlling the flow of the inert carrier gas into the mixing chamber 24 and thereby maintaining a substantially constant level of molten iron 14 in the hearth 12.

Figure 2:
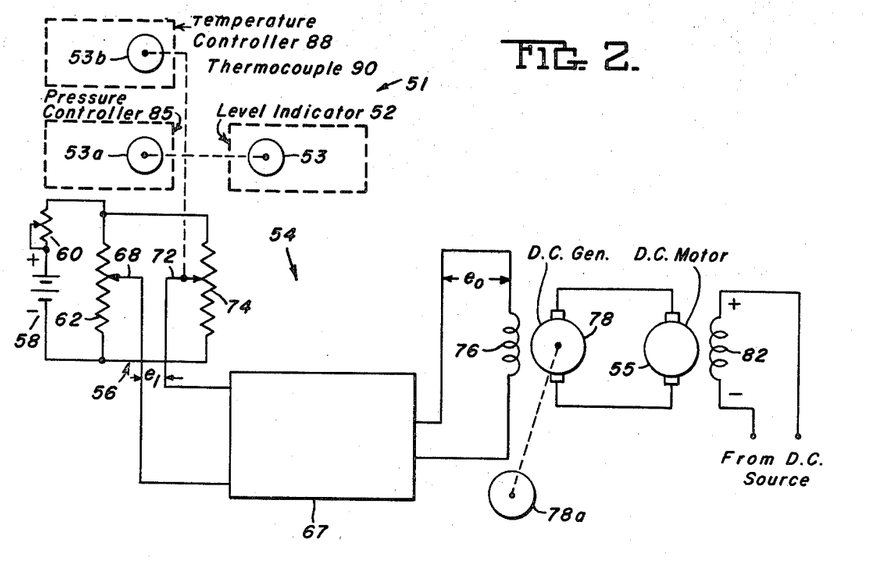
FIGURE 2 is a wiring diagram of the controller for a level control means, a pressure control means and a temperature control means shown in FIGURE 1 utilizing a level sensing means, a pressure sensing means and a temperature sensing means.

As shown in FIGURE 2, the level control means 51 consists essentially of the level indicator 52 having a motor 53, a controller 54 and a motor 55. The controller 54 includes a bridge circuit 56 having a D-C power source 58, variable resistor 60, slide wires 62 and 74, and contact arms 68 and 72 which are connected to an amplifier 67. This amplifier 67 is a type 19–101–A millivolt amplifier manufactured by Consolidated Electrodynamics, a subsidiary of Bell and Howell, 706 Bostwick Ave., Bridgeport, Conn. The arm 68 is associated with the slide wire 62. Arm 72 (movable by a motor 53) is connected to the slide wire 74. The output D-C voltage of the amplifier 67 which is proportional to the input D-C voltage is impressed on a D-C generator field coil 76 and the D-C output of the generator 78 (having an A-C drive motor 78a) is in turn connected to the D-C drive motor 55, which drive motor 55 has a constant field excitation by means of its field coil 82. The motor 53 which is part of the level indicator 52 is movable in response to a signal from such indicator 52 and is mechanically connected to the arm 72.

In operation the arm 68 (FIGURE 2) is set at the desired position to provide a set point for the desired level of molten iron 14 to be maintained in the hearth 12. The arm 72 is actuated by the motor 53 in response to a signal from the level indicator 52. If the level of the molten iron 14 is within the desired range of the set point, the controller 54 will be in balance and the drive motor 55 (FIGURES 1, 2) will remain stationary.

When the level of the molten iron 14 in the hearth 12 becomes lower than the set point, the arm 72 will be moved by the motor 53 and direct current will flow in one direction to cause the motor 55 and the valve 50 (FIGURE 1) driven thereby to rotate in a direction which will cause the first control member valve 50 (FIGURE 1) to selectively shut or decrease the flow of inert carrier gas through the inlet 36 with attendant buildup of the level of the molten iron 14 within the hearth 12 to the desired set point. When the level of molten iron 14 in the hearth 12 rises above the set point as determined by the level indicator 52, movement of the arm 72 by the motor 53 in the opposite direction will cause direct current to flow in the opposite direction to the drive motor 55, so that such drive motor 55 will selectively open the valve 50 with an attendant increase in the flow of inert carrier gas into the mixing chamber 24 with resultant increased transfer of the mixture of molten iron 14 and inert carrier gas into the separation chamber 22 and lowering of the level of the molten iron 14 in the hearth 12.

FIRST PRESSURE CONTROL MEANS 82

It will be understood that the hearth 12 is subjected to an internal pressure $P_1$ usually in the range of about 15–40 p.s.i.g. and a pressure control means is provided, such as a bleeder control device 82 (FIGURE 1), comprising the line 83 having an inlet 84 into the furnace above the hearth 12, a pressure controller 85 (FIGURES 1, 2) similar to type KP12 manufactured by the Bailey Motor Company, Cleveland, Ohio, under the trade name of Miniline transmitter and the controller 54a for operating a second control member, a valve 86. Such pressure controller 85 measures the pressure in the furnace above the hearth 12 and transmits an electrical signal to the controller 54a shown in FIGURE 1, which controller 54a has its motor 55a connected to the valve 86 for selectively opening the valve 86 when the pressure in the furnace above the hearth 12 exceeds the predetermined set point on the pressure controller 85 and selectively closing the valve 86 when the pressure within the furnace above the hearth 12 falls below such set point.

TEMPERATURE CONTROL MEANS 88

Additionally, the control means may be in the form of a temperature control means or device 88 associated with the mixing chamber 24 and one of the carrier fluid supply means, the first heating means or furnace 48, a second heating means, either the electric heater 122 (FIGURE 3E) or the gas heater 128 (FIGURE 3E) and the make-up carrier fluid inlet means 41 for controlling the temperature of the flow of the inert carrier gas into the mixing chamber 24 and thereby maintaining substantially constant the temperature in the mixture of molten iron 14 and inert carrier gas in the mixing chamber 24.

As shown in FIGURE 1, the temperature-indicating device 88 has a temperature sensing member (FIGURES 1, 2), suitably a thermocouple 90, having a platinum wire and a 13% rhodium-platinum wire with ceramic tube protection and manufactured by West Instrument Corporation, Schiller Park, Ill. The thermocouple 90 is connected to a controller 54b (FIGURE 1) of the type shown in FIGURE 2, which controller 54b has its drive motor 55b (not shown in FIGURE 2) connected to a third control member, a gas inlet valve 92, disposed in the gas line 94 for feeding fuel gas to the furnace 48.

When the temperature of the mixture of molten iron 14 and inert carrier gas in the mixing chamber 24 falls below the set point, the electrical signal from the temperature-sensing member 90 energizes the motor 53b (FIGURE 2), thereby causing the drive motor 55b of the detector 54b to selectively open the gas inlet valve 92 in one direction and increase the supply of fuel gas to the furnace 48, thereby increasing the temperature of the inert carrier gas being fed to the furnace 48 with resultant temperature increase in the inert carrier gas in the conduit 38 and attendant increase in the temperature of the mixture of molten iron 14 and inert carrier gas in the mixing chamber 24. On the other hand when the temperature of the mixture of molten iron 14 and inert carrier gas in the mixing chamber 24 exceeds the desired set point, the signal from the temperature-sensing member 90 actuates the drive motor 55b of the controller 54b in the opposite direction, thereby causing the gas inlet valve 92 to selectively close, and decrease the flow of fuel gas into the furnace 48 and resultantly decreasing the temperature of the inert carrier gas in the conduit 38 and the temperature in the mixture of molten iron 14 and inert carrier gas in the mixing chamber 24.

SECOND PRESSURE CONTROL MEANS 96

Referring again to FIGURE 1, it will be understood that the separation chamber 22 has a second pressure $P_2$ and is provided with a second pressure control means 96 associated with the conduit 38 adjacent the separation chamber 22 for maintaining the pressure $P_2$ substantially constant. This second pressure control means 96 has a pressure controller 85c which feeds an electrical signal to its motor (similar to the motor 53a, FIGURE 2) which motor in turn unbalances the controller 54c (FIGURE 1), thereby causing its drive motor 55c (FIGURE 1) to move a fourth control member, a control valve 98, disposed in the conduit 38 adjacent the inlet 40 to separation chamber 22.

When the pressure $P_2$ within the separation chamber 22 rises above the set point, an electrical signal from the pressure controller 85c moves the drive motor 55c of the controller 54c in one direction, thereby selectively opening the control valve 98 and permitting faster removal of the exit gases from the separation chamber 22 with an attendant reduction in the gas pressure $P_2$ within the separation chamber 22 to the desired set point. On the other hand, when the pressure $P_2$ within the separation chamber 22 falls below the predetermined set point, the pressure controller 85a provides the controller 54c with an electrical signal which causes its drive motor 55c to rotate the control valve 98 in the opposite direction to selectively close such valve 98, thereby permitting an increase in the pressure $P_2$ within the separation chamber 22.

SECOND LEVEL CONTROL MEANS 110

As shown in FIGURE 1, the separation chamber 22 is provided with a second fluid outlet, such as the molten iron outlet 100, located in the bottom of such separation chamber 22 and in communication with a discharge nozzle 102 for guiding the molten iron 14 into a series of collecting vessels, such as cars 104. The cars 104 have wheels 106 which ride on tracks 108 disposed therebeneath. For the purpose of controlling the flow of molten iron 14 through the molten iron outlet 100, movable stopper means, such as the stopper 107, is reciprocably mounted by means of guides 109 on the top wall (FIGURE 1) of the separation chamber 22 and such movable stopper 107 is movable by a second level control means 110 (FIGURE 1) in an out of the molten iron outlet 100 to maintain the level of molten iron 14 in the separation chamber 22 at a substantially constant level.

In addition to the above-mentioned guides 108 of the stopper means, the stopper 107 is connected by a cross bar 112 to a piston 114 of an hydraulic cylinder 116. The second level control means comprises a level indicator 52a similar to the above-described level indicator 52 shown in FIGURES 1, 2, which level indicator 52a has its motor (not shown but similar to the motor 53 shown in FIGURE 2) connected to a controller 54d having its drive motor 55d connected to a fifth control member, a control valve 118. This control valve 118 controls the flow of hydraulic fluid into each end of the hydraulic cylinder 116 (FIGURE 1).

When the level of molten iron 14 within the separation chamber 22 is above the predetermined set point, the level indicator 52a feeds an electrical signal to the controller 54d which in turn causes its drive motor 55d to move the valve 118 in one direction to cause hydraulic fluid to enter the lower end of the hydraulic cylinder 116, thus raising the stopper 106 out of the molten iron outlet 100 and permitting molten iron 14 to flow through the nozzle 102 and into the car 104. When the level of molten iron 14 is below the set point on the indicator 52a, the signal received by the controller 54d from the level indicator 54a causes rotation of the valve 118 in the opposite direction, thereby permitting passage of hydraulic fluid into the upper end of the hydraulic cylinder 116, thereby lowering the stopper 106 in the guides 108 and inserting such stopper 106 into the molten iron outlet 100 and cutting off the flow of molten iron 14 through the nozzle 102 and into the collecting vessel 104.

ALTERNATIVE EMBODIMENTS

FIRST LEVEL CONTROL MEANS 51

Figure 3A:
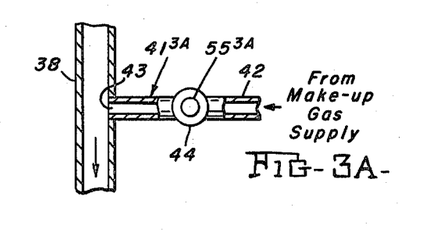
FIGURE 3A is a fragmentary side elevational view of an alternative embodiment of the first level control means showing it connected to the make-up carrier inlet means.

It will be understood by those skilled in the art that alternatively as shown in FIGURE 3A the drive motor $55^{3A}$ (FIGURE 3A) of the controller 54 (FIGURE 2) of the first level control means 51 may be connected to a sixth control member, such as the valve 44, in the make-up carrier fluid inlet means 41 to control the flow of make-up inert carrier gas into the conduit 38 and hence the flow of the molten iron 14 from the outlet 20, thereby maintaining the level of molten iron 14 at the set point on the level indicator 52.

Figure 3B:
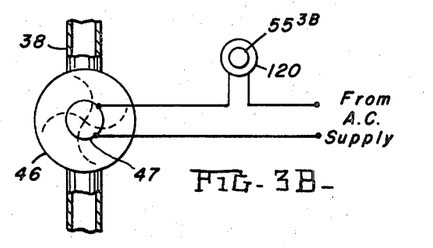
FIGURE 3B is a view similar to FIGURE 3A showing the first level control means connected to a potentiometer in the electrical circuit for the motor for driving the blower.

Alternatively, a seventh control member, a variable resistor 120 (FIGURE 3B), is included in the voltage supply line feeding the drive means (the motor 47) which drives the blower 46 and the drive motor $55^{3B}$ of the controller 54 (FIGURE 2) of the first level control means 51 is connected to such variable resistor 120 to similarly control the level of molten metal 14 in the hearth 12 (FIGURE 1).

TEMPERATURE CONTROL MEANS 88

Figure 3C:
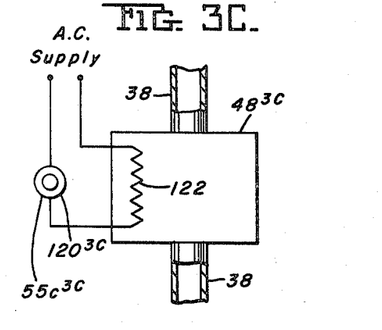
FIGURE 3C is a view similar to FIGURES 3A-3B showing an electric furnace having a potentiometer in its resistance-type heater and connected to the drive motor of the temperature control means.

In FIGURE 3C a resistance-type electrical heater $48^{3C}$ has its heater element 122 connected to an eighth control member, a variable resistor $120^{3C}$, which variable resistor $120^{3C}$ is driven by the drive motor $55c^{3C}$ of the controller 54c in the temperature control means 88.

Similarly, a similar effect can be produced by either connecting the drive motor $55c^{3C}$ of the controller 54c of the temperature control means 88 in turn to the ninth control member, the valve 126 (FIGURE 3D) of the make-up carrier fluid inlet means $41^{3D}$; to the seventh control member, the variable resistor 120 in the circuit for the motor 47 (FIGURE 3B); or to the first control member, the valve 50 in conduit 38 (FIGURE 1).

Figure 3D:
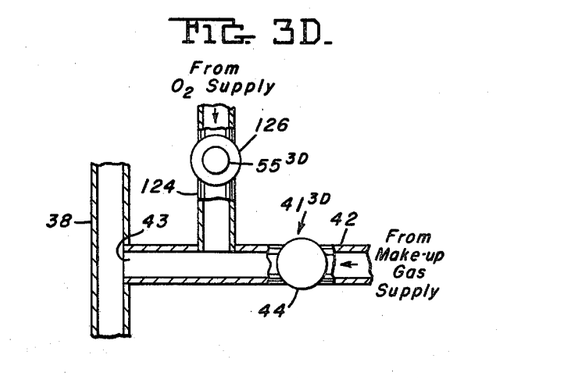
FIGURE 3D is a view similar to FIGURES 3A-3C showing an oxygen supply means connected to the make-up carrier fluid inlet means and to the temperature control means.

Referring to FIGURE 3D, the make-up carrier fluid inlet means $41^{3D}$ has an oxygen inlet line 124 provided with a ninth control member, a valve 126, connected to the drive motor $55c^{3D}$ of the controller 54c of the temperature control means 88 so that the combustible metalloids or oxidizable impurities (C, Si, Mn and the like) in the molten iron 14 will burn and heat the mixture of molten iron 14 and inert carrier gas in the mixing chamber 24.

Figure 3E:
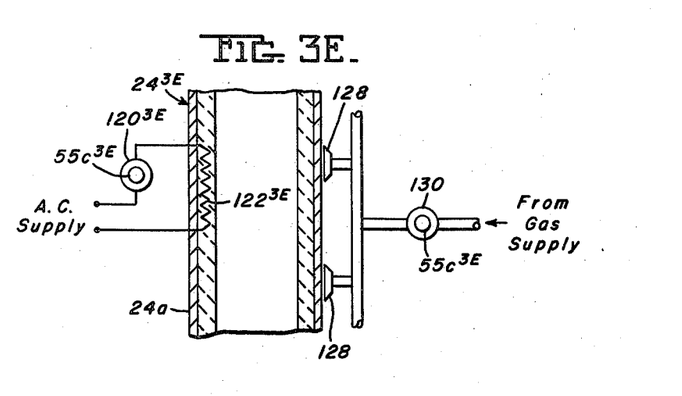
FIGURE 3E is a view similar to FIGURES 3A-3D showing a second heating means in and adjacent to the walls of the mixing chamber.

FIGURE 3E shows in the left-hand wall of the mixing chamber $24^{3E}$ an electric heater $122^{3E}$ controlled by such control member, a tenth control member, variable resistor $120^{3E}$ connected to the drive motor $55c^{3E}$ of the controller 54c of the temperature control means 88. Alternatively gas heaters 128 are disposed along and around the right periphery of the mixing chamber $24^{3E}$ and have an eleventh control member, the valve 130, driven by the drive motor $55c^{3E}$ of such controller 54c of the temperature control means 88.

Figure 4A:
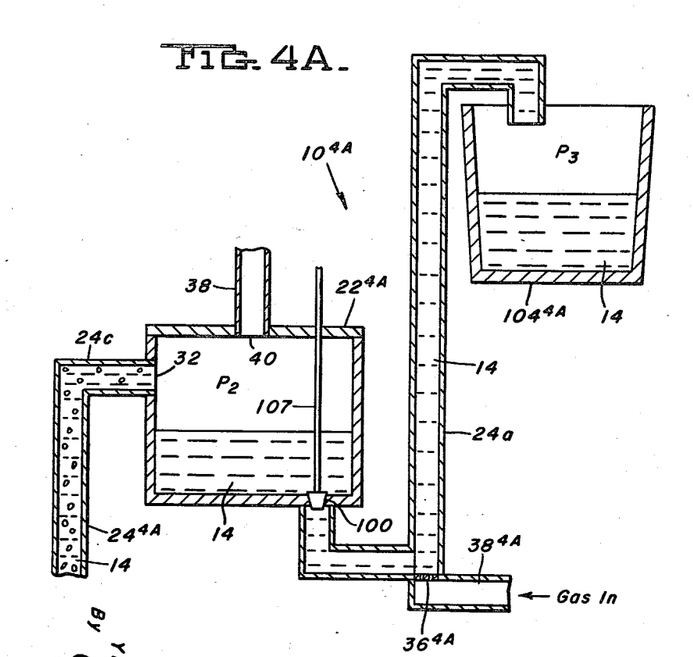
FIGURE 4A is a fragmentary side elevational view of a cascaded flow control apparatus for use with a separation chamber having a pressure greater than atmospheric.

When the pressure $P_2$ in the separation chamber $22^{4A}$ (FIGURE 4A) is greater than atmospheric, the apparatus $10^{4A}$ may be cascaded by the use of a second mixing chamber 24a extending to a collecting vessel $104^{4A}$ at atmospheric pressure $P_3$.

Figure 4B:
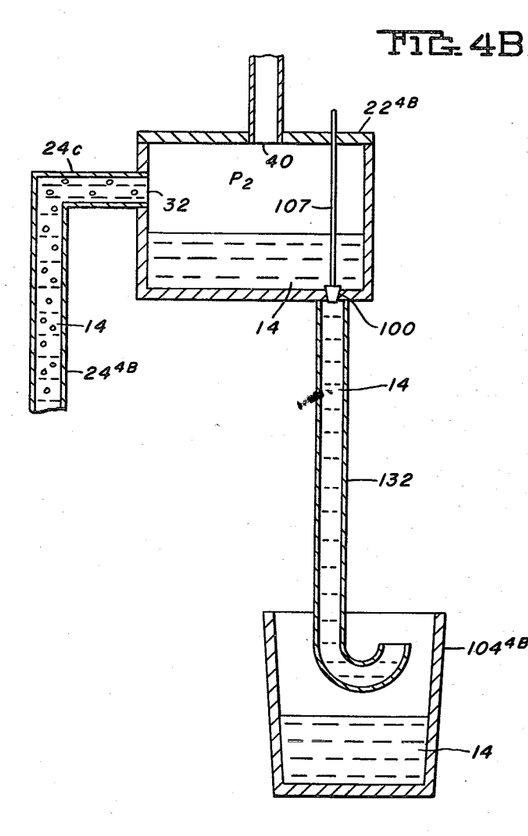
FIGURE 4B is a view similar to FIGURE 4A showing a barometric leg for use with a separation chamber having a pressure less than atmospheric.

In FIGURE 4B the pressure $P_2$ in separation chamber $22^{4B}$ is below atmospheric and a barometric leg 132 is employed to deliver the molten iron 14 to the vessel $104^{4B}$.

In order to simplify the above description, the various control means and control members are summarized in the following tables:

TABLE I

| Control Member | Figure | Claims |
|---|---|---|
| First Control Member, Valve 50 | 1 | 4, 13 |
| Second Control Member, Valve 86 | 1 | 7 |
| Third Control Member, Valve 92 | 1 | 10 |
| Fourth Control Member, Valve 98 | 1 | 22 |
| Fifth Control Member, Valve 118 | 1 | 23 |
| Sixth Control Member, Valve 44 | 3A | 24 |
| Seventh Control Member, Variable resistor 102 | 3B | 5, 14 |
| Eighth Control Member, Variable resistor $120^{3C}$ | 3C | 11 |
| Ninth Control Member, Valve 126 | 3D | 16 |
| Tenth Control Member, Variable resistor $120^{3E}$ | 3E | 18 |
| Eleventh Control Member, Valve 130 | 3E | 19 |

TABLE II

| Control Means | Associated Control Member | | Claims |
|---|---|---|---|
| First Level Control Means 51. | First Control Member | Valve 50 | 2–24 |
| | Sixth Control Member | Valve 44 | |
| | Seventh Control Member | Variable resistor 120. | |
| First Pressure Control Means 82. | Second Control Member | Valve 86 | 25 |
| Temperature Control Means 88. | Third Control Member | Valve 92 | 26 |
| | Eighth Control Member | Variable resistor $120^{3C}$. | |
| | Sixth Control Member | Valve 44 | |
| | Seventh Control Member | Variable resistor 120. | |
| | First Control Member | Valve 50 | |
| | Ninth Control Member | Valve 126 | |
| | Tenth Control Member | Variable resistor $120^{3E}$. | |
| | Eleventh Control Member | Valve 130 | |
| Second Pressure Control Means 96. | Fourth Control Member | Valve 98 | 27 |
| Second Level Control Means 110. | Fifth Control Member | Valve 118 | 28 |

Alternatively, as shown in FIGURE 1, temperature controllers may be installed, such as the thermocouple 90c in the separation chamber 22 and the thermocouple 90d in the conduit 38 of the fluid carrier means 34. Further, a pressure controller 82d may be installed in the conduit 34 of the fluid carrier means 34. In turn these devices may be employed to operate any one of the fluid material containers 12, mixing chamber 24, separation chamber 22 or the fluid carrier means 34 as in the case of the control means listed in Tables I and II above.

TYPICAL INSTALLATION

Figure 5:
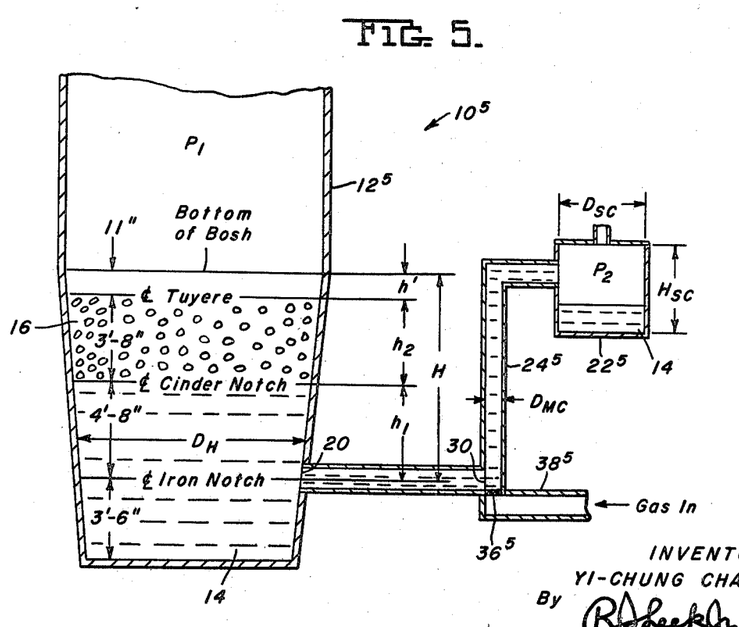
FIGURE 5 is a schematic side elevational view of a typical installation of the flow control apparatus of the present invention.

A typical installation for continuously discharging a blast furnace is schematically shown in FIGURE 5. The blast furnace has a hearth diameter $D_H$ of about 28 feet and produces about 2100 tons of pig iron 14 (hot metal)

per 24 hours. The flow rate for continuous and uniform discharge is about 49 pounds per second, approximately 188 cubic inches in volume. The size of the apparatus $10^5$ required and a set of typical operating conditions are as follows:

Inside diameter $D_{mc}$ of the mixing chamber $24^5$ should be about 10 inches. The diameter $D_{mc}$ is determined by the height of the mixing chamber 24, the amount of inert carrier gas used and frictional resistances to the flow. It is estimated that the diameter $D_{mc}$ should be between 6 and 12 inches. The temperature of the inside walls of the mixing chamber 24, the inside walls of the separation chamber 22 and of the inert carrier gas should be about 2600° F. Such temperature can be anywhere between 2400 and 3000° F., but never lower than that of the hot metal 14 from the hearth $12^5$ of blast furnace. The pressure $P_2$ in the separation chamber 22 is related to the gage pressure $P_1$ existing above the slag 16 in the hearth $12^5$ of the blast furnace.

The value for $P_1$ is about 15 p.s.i.g. for normal blast furnace operation and for a pressurized furnace 10 it may go as high as 40 p.s.i.g. The value for $P_2$ is usually equal to or less than $P_1$.

The height of the lift H $(h_1+h_2+h')$ is about 9.34 feet. The height H of the lift should be such that the hearth $12^5$ will not discharge without injection of inert carrier gas into the mixing chamber $24^5$. Since the height of hot metal $(h_1)$ in the hearth $12^5$ is about 4.67 feet, height of slag $(h_2)$ is about 3.67. The minimum height $H_{min}$ for the lift H is $h_1+h_2$ (density correction factor) = lift height $H_{min}$ or:

$$4.67 + 3.67\left(\frac{3}{7.4}\right) = 6.17 \text{ feet}$$

where 3 is the slag density and 7.4 is the molten metal density. The upper limit of height $H_{max}$ is determined by the amount of gas injection and the value of $P_2$, the pressure in separation chamber $22^5$. The interior size of the separation chamber $22^5$ is about 4 feet in diameter $D_{sc}$ by 6 feet high $H_{sc}$.

The minimum quantity of inert carrier gas injected (i.e., nitrogen for example) is determined by means of the following equations:

$$d_{l_1}h_1 + d_{l_2}h_2 + d_a h' + P_1 = [(1-X)d_{l_1} + Xd_g](h_1+h_2+h') + P_2 \quad (1)$$

where:

$d_{l_1}$=density of hot metal=462 lb./cu. feet
$h_1$=height of hot metal in hearth=4.67 feet
$d_{l_2}$=density of slag=187 lb./cu. feet
$h_2$=height of slag in hearth=3.67 feet
$d_a$=density of gas above hearth 0.028 lb./cu. feet
$h'$=height of lift above slag layer in hearth=1.0
$P_1=P_2=15$ p.s.i.g.
$d_g$=average density of lift gas=0.034 lb./cu. feet
$X$=volume fraction of lift gas in gas-metal mixture measured at the average density $d_g$.

By substituting these values into Equation 1 and solving for X, we get $X=0.34$.

That is, the amount of gas (nitrogen) injected should be at least 34 percent of the volume of the mixture of molten iron 14 and inert carrier gas. The exact amount of gas required depends on the desired flow rate, and frictional resistances in the mixing chamber $24^5$. However, the effect of the height H of the lift on the requirement of inert carrier gas can be demonstrated with Equation 1. For example, in Equation 1, if $h'=0$, then the value of X is 0.26 or 26 percent. The effect of $P_2$ can also be demonstrated. If $P_2$ is 5 p.s.i. less than $P_1$ (or $P_1-P_2=5\times144$ lb./sq. foot), the value of X is 0.17 or 17 percent.

From this discussion it can be inferred that by either regulating the amount of inert carrier gas or the pressure in the separation chamber $22^5$ ($P_2$), the flow of the molten metal 14 can be accurately controlled.

SUMMARY OF THE ACHIEVEMENT OF THE OBJECTS OF THE INVENTION

It will be recognized by those skilled in the art that the objects of this invention have been achieved by providing an apparatus for controlling the flow of fluid material and a carrier fluid having a density less than the fluid material. This apparatus 10, $10^5$ (FIGURES 1 through 5) has a simple rugged structure; has no moving parts in contact with the fluid material 14; requires a minimum of maintenance, controls the flow rate of the fluid material 14 from the fluid material container or hearth 12, $12^5$ to maintain a constant level in such hearth 12, $12^5$ and discharges the fluid material 14 to a pressure $P_2$ in the separation chamber 22, which pressure $P_2$ is either higher or lower than atmospheric pressure. In addition, such apparatus 10, $10^5$ maintains substantially constant the level of fluid material 14 in the hearth 12, $12^5$; the predetermined pressure $P_1$ in the hearth 12, $12^5$; the temperature of the mixture of molten iron 14 and inert carrier gas in the mixing chamber 24, $24^5$; the pressure $P_2$ in the separation chamber 22, $22^5$ and the level of the fluid material in the separation chamber 22, $22^5$.

While in accordance with the patent statutes preferred and alternative embodiments of this invention have been illustrated and described in detail, it is to be particularly understood that the invention is not limited thereto or thereby.

I claim:
1. Apparatus for controlling the flow of a fluid material and having:
 (a) a fluid material container disposed at a first level for containing said fluid material and having a first fluid material outlet,
 (b) a separation chamber for receiving said fluid material and a carrier fluid having a density less than said fluid material,
 (c) a mixing chamber having one end spaced from said first level and connected to said fluid material container and said separation chamber and for mixing said fluid material and said carrier fluid,
 (d) carrier fluid supply means connected to said mixing chamber adjacent said fluid material container for introducing said carrier fluid into said mixing chamber to mix said fluid material and said carrier fluid into a mixture having a density less than said fluid material and to cause an unbalance between the forces on the fluid material in said fluid material container and the forces on the mixture in said mixing chamber, thereby causing the transfer of said fluid material and said carrier fluid to said separation chamber, and a control means connected to one of said fluid material container, said separation chamber, said mixing chambers and said carrier fluid supply means for detecting a condition in said one and associated with one of the remaining of said fluid material container, said separation chamber, said mixing chamber and said carrier fluid supply means for controlling said condition in said one.

2. Apparatus for controlling the flow of a fluid material and having:
 (a) a fluid material container disposed at a first level for containing said fluid material and having a first fluid material outlet,
 (b) a separation chamber for receiving said fluid material and a carrier fluid having a density less than said fluid material,
 (c) a mixing chamber having one end spaced from said first level and connected to said fluid material container and said separation chamber and for mixing said fluid material and said carrier fluid,
 (d) carrier fluid supply means connected to said mixing chamber adjacent said fluid material container for introducing said carrier fluid into said mixing chamber to mix said fluid material and said carrier fluid into a mixture having a density less than said fluid material and to cause an unbalance between the forces on the fluid material in said fluid material container and the forces on the mixture in said mixing chamber, thereby causing the transfer of said fluid material and said carrier fluid to said separation chamber,
   (1) said carrier fluid supply means having make-up carrier fluid inlet means, and
(e) level control means in said fluid material container and connected to one of said carrier fluid supply means and said make-up carrier fluid inlet means for controlling the flow of said carrier fluid into said mixing chamber and thereby maintaining a substantially constant level of fluid material in said fluid material container.

3. The apparatus recited in claim 2 wherein said one is said carrier fluid supply means.

4. The apparatus recited in claim 3 wherein carrier fluid supply means has a first control member and said level control means is connected to said first control member.

5. The apparatus recited in claim 3 wherein said carrier fluid supply means has a drive means and a seventh control member connected to said drive means and said level control means is connected to said seventh control member.

6. The apparatus recited in claim 2 wherein said one is said make-up carrier fluid inlet means.

7. The apparatus recited in claim 2 wherein said fluid material container has a first pressure and having a first pressure control means associated with said fluid material container for maintaining said first pressure substantially constant.

8. The apparatus recited in claim 2 and having a first heating means connected to said carrier fluid supply means, a second heating means connected to said mixing chamber, and temperature control means associated with said mixing chamber and one of said carrier fluid supply means, said first heating means, said second heating means and said make-up carrier fluid inlet means for controlling the temperature of the flow of carrier fluid into said mixing chamber and thereby maintaining substantially constant temperature in said mixture in said mixing chamber.

9. The apparatus recited in claim 8 wherein said one is said first heating means.

10. The apparatus recited in claim 8 wherein said first heating means is a gas heater and has a third control member and said temperature control means is connected to said third control member.

11. The apparatus recited in claim 9 wherein said first heating means is an electric heater and has a heating element and an eighth control member connected to said heating element and said temperature control means is connected to said eighth control member.

12. The apparatus recited in claim 8 wherein said one is said carrier fluid supply means.

13. The apparatus recited in claim 12 wherein said carrier fluid supply means has a first control member and said temperature control means is connected to said first control member.

14. The apparatus recited in claim 12 wherein said carrier fluid supply means has a drive means and a seventh control member connected to said drive means and said temperature control means is connected to said seventh control member.

15. The apparatus recited in claim 8 wherein said one is said make-up carrier fluid inlet means.

16. The apparatus recited in claim 15 wherein oxygen supply means is connected to said make-up carrier fluid inlet means and said temperature control means is connected to said oxygen supply means.

17. The apparatus recited in claim 8 wherein said one is said second heating means.

18. The apparatus recited in claim 17 wherein said second heating means has an electric heater and a tenth control member and said temperature control means is connected to said tenth control member.

19. The apparatus recited in claim 16 wherein said second heating means is a gas heater and has an eleventh control member and said temperature control means is connected to said eleventh control member.

20. The apparatus recited in claim 2 wherein the pressure in said separation chamber is greater than atmospheric and a second mixing chamber is in series with said separation chamber.

21. The apparatus recited in claim 2 wherein said pressure in said separation chamber is less than atmospheric pressure and having a barometric leg in series with said separation chamber.

22. The apparatus recited in claim 2 wherein said separation chamber has a second pressure and having a second pressure control means associated with said separation chamber and said carrier fluid supply means for maintaining said second pressure substantially constant.

23. The apparatus recited in claim 2 wherein said separation chamber has a second fluid outlet and having movable stopper means in said second fluid outlet and a second level control means in said separation chamber and connected to said stopper means for moving said stopper means into and out of said second fluid outlet to maintain the level of fluid material in said separation chamber at a substantially constant level.

24. The apparatus recited in claim 1 wherein said carrier fluid supply means has make-up carrier fluid inlet means, said make-up carrier fluid inlet means has a sixth control member and said level control means is connected to said sixth control member.

25. Apparatus for controlling the flow of a fluid material and having:
(a) a fluid material container disposed at a first level for containing said fluid material and having a first fluid material outlet,
(b) separation chamber for receiving said fluid material and a carrier fluid having a density less than said fluid material,
(c) a mixing chamber having one end spaced from said first level and connected to said fluid material container and said separation chamber and for mixing said fluid material and said carrier fluid,
(d) carrier fluid supply means connected to said mixing chamber adjacent said fluid material container for introducing said carrier fluid into said mixing chamber to mix said fluid material and said carrier fluid into a mixture having a density less than said fluid material and to cause an unbalance between the forces on the fluid material in said fluid material container and the forces on the mixture in said mixing chamber, thereby causing the transfer of said fluid material and said carrier fluid to said separation chamber, and wherein said fluid material has a first pressure and having a first pressure control means associated with said first fluid material container for maintaining said first pressure substantially constant.

26. Apparatus for controlling the flow of a fluid material and having:
(a) a fluid material container disposed at a first level for containing said fluid material and having a first fluid material outlet,
(b) a separation chamber for receiving said fluid material and a carrier fluid having a density less than said fluid material,
(c) a mixing chamber having one end spaced from said first level and connected to said fluid material container and said separation chamber and for mixing said fluid material and said carrier fluid,
(d) carrier fluid supply means connected to said mixing chamber adjacent said fluid material container for introducing said carrier fluid into said mixing chamber to mix said fluid material and said carrier fluid into a mixture having a density less than said fluid material and to cause an unbalance between the forces on the fluid material in said fluid material container and the forces on the mixture in said mixing chamber, thereby causing the transfer of said fluid material and said carrier fluid to said separation chamber,
   (1) said carrier fluid supply means having make-up carrier fluid inlet means and having a first heating means connected to said carrier fluid supply means, a second heating means connected to said mixing chamber, and temperature control means associated with said mixing chamber and one of said carrier fluid supply means, said first heating means, said second heating means and said make-up carrier fluid inlet means for controlling the temperature of the flow of carrier fluid into said mixing chamber and thereby maintaining substantially constant temperature in said mixture in said mixing chamber.

27. Apparatus for controlling the flow of a fluid material and having:
   (a) a fluid material container disposed at a first level for containing said fluid material and having a first fluid material outlet,
   (b) a separation chamber for receiving said fluid material and a carrier fluid having a density less than said fluid material,
   (c) a mixing chamber having one end spaced from said first level and connected to said fluid material container and said separation chamber and for mixing said fluid material and said carrier fluid,
   (d) carrier fluid supply means connected to said mixing chamber adjacent said fluid material container for introducing said carrier fluid into said mixing chamber to mix said fluid material and said carrier fluid into a mixture having a density less than said fluid material and to cause an unbalance between the forces on the fluid material in said fluid material container and the forces on the mixture in said mixing chamber, thereby causing the transfer of said fluid material and said carrier fluid to said separation chamber, wherein said separation chamber has a second pressure and having a second pressure control means associated with said separation chamber and said carrier fluid supply means for maintaining said second pressure substantially constant.

28. Apparatus for controlling the flow of a fluid material and having:
   (a) a fluid material container disposed at a first level for containing said fluid material and having a first fluid material outlet,
   (b) a separation chamber for receiving said fluid material and a carrier fluid having a density less than said fluid material,
   (c) a mixing chamber having one end spaced from said first level and connected to said fluid material container and said separation chamber and for mixing said fluid material and said carrier fluid,
   (d) carrier fluid supply means connected to said mixing chamber adjacent said fluid material container for introducing said carrier fluid into said mixing chamber to mix said fluid material and said carrier fluid into a mixture having a density less than said fluid material and to cause an unbalance between the forces on the fluid material in said fluid material container and the forces on the mixture in said mixing chamber, thereby causing the transfer of said fluid material and said carrier fluid to said separation chamber,
   (1) said carrier fluid supply means having make-up carrier fluid inlet means, and wherein said separation chamber has a second fluid outlet and having movable stopper means in said second fluid outlet and a second level control means in said separation chamber and connected to said stopper means for moving said stopper means into and out of said second fluid outlet to maintain the level of fluid material in said separation chamber at a substantially constant level.

References Cited

UNITED STATES PATENTS 2,937,789 5/1960 Tama _______________ 222—1
3,123,015 3/1964 Linklater __________ 103—234

STANLEY H. TOLLBERG, Primary Examiner